US007797223B1

(12) United States Patent
Mellina

(10) Patent No.: US 7,797,223 B1
(45) Date of Patent: *Sep. 14, 2010

(54) METHOD AND SYSTEM FOR EFFICIENTLY MATCHING LONG AND SHORT POSITIONS IN SECURITIES TRADING AND TRANSACTING A SERIES OF OVERNIGHT TRADES FOR BALANCE SHEET NETTING

(75) Inventor: Thomas K. Mellina, Hoboken, NJ (US)

(73) Assignee: Citigroup Global Markets, Inc., New York, NY (US)

( * ) Notice: Subject to any disclaimer, the term of this patent is extended or adjusted under 35 U.S.C. 154(b) by 649 days.

This patent is subject to a terminal disclaimer.

(21) Appl. No.: 11/520,692

(22) Filed: Sep. 14, 2006

Related U.S. Application Data

(62) Division of application No. 10/813,521, filed on Mar. 29, 2004, now abandoned.

(60) Provisional application No. 60/457,929, filed on Mar. 28, 2003.

(51) Int. Cl.
*G06Q 40/00* (2006.01)

(52) U.S. Cl. .......................................... 705/37; 705/38

(58) Field of Classification Search .............. 705/37–38
See application file for complete search history.

(56) References Cited

U.S. PATENT DOCUMENTS

| 4,674,044 A | 6/1987 | Kalmus et al. ................. 705/37 |
| 4,751,640 A | 6/1988 | Lucas et al. ................ 705/36 R |
| 4,903,201 A | 2/1990 | Wagner ........................ 705/37 |
| 5,077,665 A | 12/1991 | Silverman et al. .............. 705/37 |
| 5,101,353 A | 3/1992 | Lupien et al. .................. 705/37 |
| 5,136,501 A | 8/1992 | Silverman et al. .............. 705/37 |
| 5,508,913 A | 4/1996 | Yamamoto et al. ............. 705/37 |
| 5,563,783 A | 10/1996 | Stolfo et al. .................... 705/8 |
| 5,692,233 A | 11/1997 | Garman .................... 705/36 R |
| 5,727,165 A | 3/1998 | Ordish et al. .................. 705/37 |

(Continued)

FOREIGN PATENT DOCUMENTS

EP          0 399 850          11/1990

(Continued)

OTHER PUBLICATIONS

U.S. Appl. No. 11/520,691, filed Sep. 2006, Mellina, Thomas K.*

(Continued)

*Primary Examiner*—Thu Thao Havan
(74) *Attorney, Agent, or Firm*—King & Spalding LLP

(57) ABSTRACT

A method and system for trading long and short inventory positions in securities for participants involves systematically obtaining long and short position information from each participant, processing the information in accordance with participant-controlled parameters, matching the participants' short positions to other participants' long positions and feeding the resultant activity back to each participant in the form of system-generated repo and reverse repo trades, while maintaining the anonymity of the participants. Another aspect enables trading baskets of serial overnight trades, each of which is treated as an independent overnight repo/reverse trade for financial reporting purposes, with corresponding notional amount, that involves, for example, cancellation of a basket trade and creating in its place a series of overnight trades corresponding to the basket trade.

21 Claims, 2 Drawing Sheets

U.S. PATENT DOCUMENTS

| | | | |
|---|---|---|---|
| 5,884,286 A | 3/1999 | Daughtery, III | 705/36 R |
| 5,905,974 A | 5/1999 | Fraser et al. | 705/36 R |
| 5,924,082 A | 7/1999 | Silverman et al. | 705/37 |
| 5,950,176 A | 9/1999 | Keiser et al. | 705/36 R |
| 5,970,479 A | 10/1999 | Shepherd | 705/37 |
| 6,014,643 A | 1/2000 | Minton | 705/36 R |
| 6,016,482 A | 1/2000 | Molinari et al. | 705/35 |
| 6,016,483 A | 1/2000 | Rickard et al. | 705/36 R |
| 6,029,146 A | 2/2000 | Hawkins et al. | 705/35 |
| 6,061,662 A | 5/2000 | Makivic | 705/36 R |
| 6,076,074 A | 6/2000 | Cotton et al. | 705/40 |
| 6,112,189 A | 8/2000 | Rickard et al. | 705/36 R |
| 6,131,087 A | 10/2000 | Luke et al. | 705/26 |
| 6,134,536 A | 10/2000 | Shepherd | 705/37 |
| 6,148,293 A | 11/2000 | King | 705/35 |
| 6,157,918 A | 12/2000 | Shepherd | 705/36 R |
| 6,173,272 B1 | 1/2001 | Thomas et al. | 705/42 |
| 6,233,566 B1 | 5/2001 | Levine et al. | 705/36 R |
| 6,247,000 B1 * | 6/2001 | Hawkins et al. | 705/37 |
| 6,263,321 B1 | 7/2001 | Daughtery, III | 705/36 R |
| 6,343,277 B1 | 1/2002 | Gaus et al. | 705/37 |
| 6,393,409 B2 | 5/2002 | Young et al. | 705/37 |

FOREIGN PATENT DOCUMENTS

| | | |
|---|---|---|
| EP | 0 434 224 | 6/1991 |
| WO | WO 90/10910 | 9/1990 |
| WO | WO 97/08640 | 3/1997 |
| WO | WO 99/19821 | 4/1999 |
| WO | WO 01/52150 | 7/2001 |
| WO | WO 01/61602 | 8/2001 |
| WO | WO 01/80131 | 10/2001 |
| WO | WO 01/84450 | 11/2001 |
| WO | WO 02/47314 | 6/2002 |

OTHER PUBLICATIONS

Governmental Securities Clearing Corporation web pages, retrieved from the Internet on Apr. 30, 2002 at URLs: http://www.gscc.com/about_gscc.html; http://www.gscc.com/about_gscc_navigation.html; http://www.gscc.com/gscc_logo.html; http://www.gscc.com/services.html; http://www.gscc.com/services_navigation.html; http://www.gscc.com/services_for_repurchase_agreements.html; http://www.gscc.com/netting_and settlement.html; http://www.gscc.com/trade_comparison.html.

Hakimattar, L., A New Breed of E-Commerce Engine Drives Profits—For Technology to Be Valuable to HPI Players, It Must Give Them the Tools to Make and Execute the Right Decisions, Rather Than Provide a Faster Means for Making the Wrong Ones (E-Business), Hydrocarbon Processing, vol. 80, No. 12, pp. 64(4), Dec. 2001.

Flood, Mark, Microstructure Theory and the Foreign Exchange Market, Federal Reserve Bank of St. Louis Review, vol. 73, No. 6, pp. 52(19), Nov.-Dec. 1991.

Hallford, Joshua, CBB Systems to Go Live Over Cantor's Objections, Securities Industry News. vol. 10, No. 29, p. 1, Jul. 27, 1998.

Sandman, John, Experts See Bigger Role for Repos in Electronic Trading, Securities Industry News, Jan. 15, 2001.

Web page entitled "Overview," retrieved from the Internet at URL http:/www.tradeweb.com/AboutTradeWeb/Introduction.htm on Apr. 23, 2001.

BrokerTec Global, LLC web pages, retrieved from the Internet on Apr. 24, 2001 at URLs: http://www.btec.com/newsite/AboutBtec/AboutBtec.cfm http://www.btec.com/newsite/AboutBtec/TradingBenefits.cfm http://www.btec.com/newsite/AboutBtec/SecuritiesTraded.cfm.

Cantor Exchange web pages, retrieved from the Internet on Apr. 24, 2001 at URLs: http://cx.cantor.com/htdocs/main/topnav.html http://cx.cantor.com/htdocs/main/main.html http://cx.cantor.com/htdocs/facts/factsmain.html http://cx.cantor.com/htdocs/facts/advantagemain.html http://cx.cantor.com.facts.newmain.html.

* cited by examiner

METHOD AND SYSTEM FOR EFFICIENTLY MATCHING LONG AND SHORT POSITIONS IN SECURITIES TRADING AND TRANSACTING A SERIES OF OVERNIGHT TRADES FOR BALANCE SHEET NETTING

PRIORITY APPLICATION

This application is a divisional of and claims priority to U.S. patent application Ser. No. 10/813,521, filed Mar. 29, 2004, now abandoned which claims the priority to U.S. Provisional Patent Application Ser. No. 60/457,929, filed Mar. 28, 2003, which are hereby incorporated by reference in their entirety.

FIELD OF THE INVENTION

The present invention relates to the field of secured financing. More particularly, the present invention relates to a method and system, having a web-based portal or other user interface access, for matching long and short positions in securities trading to optimize capital, reduce costs, and expand risk management capabilities among trading entities that actively transact in the short-term financing markets.

DEFINITIONS

Bp(s) means basis point(s); there are 100 basis point in one percent; thus, an interest rate of, for example, 1.25% can be represented as 125 basis points.

CUSIP number is a nine-character number that uniquely identifies a particular security. CUSIP is an acronym for the Committee on Uniform Securities and Identification Procedures, the standards body which created and maintains the classification system. Foreign securities have a similar number, called the CINS number.

FIN 41 is a rule promulgated by the Financial Accounting Standards Board (FASB) that allows term repo and reverse repo trades with the same counterparty, the same maturity or end date, and the same clearing location to be netted off a trader's balance sheet.

FTP means File Transfer Protocol, a communication protocol used to transfer files through a TCP/IP network.

GC means general collateral

GSCC means Government Securities Clearing Corporation, a registered clearing corporation affiliated with the National Securities Clearing Corporation, with the primary purpose of ensuring orderly clearance and settlement in the U.S. government securities marketplace.

Off-side transaction or end-leg is the second or terminating side of a repo/reverse repo trade.

On-side transaction or start-leg is the first or beginning side of a repo/reverse repo trade.

Open repo or day-to-day repo is a repo which can be terminated by either party at any time, and which has an unspecified repurchase date.

Overnight repo is a repo with a term of one day.

Term repo is a repo with a term of more than one day.

Repo is a repurchase agreement; a contract in which the seller of securities, such as treasury bills, agrees to buy them back at a specified time for money equal to the original sale price plus financing interest.

Reverse repo is a reverse repurchase agreement; a purchase of securities with an agreement to resell them for money equal to the original purchase price plus financing interest at a specified future date.

SEC is the Securities Exchange Commission.

Settlement date is the purchase date of collateral.

BACKGROUND

At present, securities broker dealers in securities markets can cover their short positions by borrowing securities: from security lenders who often warehouse securities on behalf of the lenders' customers, directly from customers to obtain the securities, or from other broker dealers. However, it is not advantageous for broker dealers to borrow securities directly from other broker dealers because that will expose their identity and their current positions in certain securities. With such knowledge, competitors can corner the securities market on the exposed broker dealers and charge exorbitant rates for securities lending.

Another technique for broker dealers to cover their short positions is to go through an inter-dealer broker who is a registered broker with the SEC and provides a centralized means for traders, such as Salomon Smith Barney, to put up offers and bids for different types of collateral, such as securities. Those offers and bids are then shown to the entire trading market while keeping those traders making the offers and bids anonymous. This technique minimizes the exposure of broker dealers in borrowing and lending securities to others, including potential competitors.

Nevertheless, broker-dealer and client-related functions in the securities trading industry for all of the aforementioned techniques conventionally require a significant amount of dedicated resources in the front, mid and back office support areas of many financing desks. Additionally, because most of trading activities are commonly executed through inter-dealer brokers and securities lenders, additional costs to trading entities are needed for fees and margin costs on trading transactions.

SUMMARY OF THE INVENTION

There exists a need for diversified financing products in the securities markets, such as the short-term interest rate market, that enable financial market participants to significantly reduce the financing and operational costs associated with transacting in the repo markets, while improving risk management and reporting capabilities. Hence, the present invention provides a series of diversity financing products to the financial services industry. These products include systems and methods for providing market efficiencies by applying technology to a series of applications for automating broker-dealer and client-related functions in securities trading that currently require a significant amount of dedicated resources, in the front, mid and back office support areas of many financing desks.

The financing products of the present invention include aspects referred to herein as "TradeCalc." An objective of the TradeCalc aspect is to provide participating trading members with a new market for trading baskets of serial overnight trades so that members can take advantage of balance sheet netting allowed under FIN 41.

Traders such as broker-dealers are under constant balance sheet pressure and need to price competitively, especially as markets mature. Consequently, spreads narrow and clients demand larger balance sheet allocations. The TradeCalc aspects of the present invention can increase market efficiencies and reduce costs associated with providing this leverage to their clients. The balance sheet netting benefits provided by the TradeCalc aspect enable trading members to increase trading activity. If a member decides to increase trading activity in the TradeCalc market, this activity is also eligible for FIN 41 netting. This cyclical process allows members to further increase their financing activity.

Features and advantages of the TradeCalc aspect of an embodiment of the present invention include, for example: GSCC novation, including both the current overnight trade and the one-day forward trade for effective balance sheet netting allowed under FIN-41 and operational settlement savings; a concept of rate curvature, wherein an index is used to calculate implied daily forward curve, and having market representative rates on the individual overnight trades to keep the trades independent and to prevent impact of trades on one another; and booking of a term trade as all overnight trades or as a current overnight trade, a forward overnight trade, and a forward term trade for the remaining days. Further features and advantages of the TradeCalc aspect of an embodiment of the present invention include, for example: payment of interest daily on each trade of a series of overnight trades to keep the trades independent from one another in the series; functional logic for automation of the splitting of trades using rate curvature; submitting trades by direct entry or batch mode (FTP); functionality to propagate substitutions, cancellations and corrections to all overnight trades in the series with a settlement date greater than that of the changed trade; and pricing methodology of charging a significantly smaller fee based on any desired criteria.

Additionally, preferred embodiments of the present invention provide a series of diversified financial services, including: trade matching, as-agent trade execution with anonymity of principal counterparties, as-principal trade execution, clearance and settlement interfaces, omnibus clearing, books and records postings, and transaction audit trail/reconciliation reporting.

A TradeCalc aspect of an embodiment of the invention likewise utilizes computer hardware and software to provide a method and system for trading baskets of serial overnight trades, each of which is treated as an independent overnight repo/reverse trade for financial reporting purposes, with corresponding notional amount, that involves, for example, receiving a feed of data regarding basket trades from internal systems of each of a plurality of participants and comparing the basket trade data based on predefined transaction criteria to determine that both sides of each basket trade have been received and are matched. If each basket trade is matched, each basket trade is canceled and a series of overnight trades corresponding to each basket trade is created in its place, and details of the cancellation and new overnight trades are sent to the originating participants. Canceling each basket trade and creating in its place the series of overnight trades involves, for example, canceling a basket trade for n days and creating a series of new overnight trades having an overnight trade and n−1 forward overnight trades for each of two participants that submitted a matched term trade.

Additional objects, advantages and novel features of the invention will be set forth in part in the description which follows, and in part will become more apparent to those skilled in the art upon examination of the following, or may be learned from practice of the invention.

DETAILED DESCRIPTION

Figure 1:
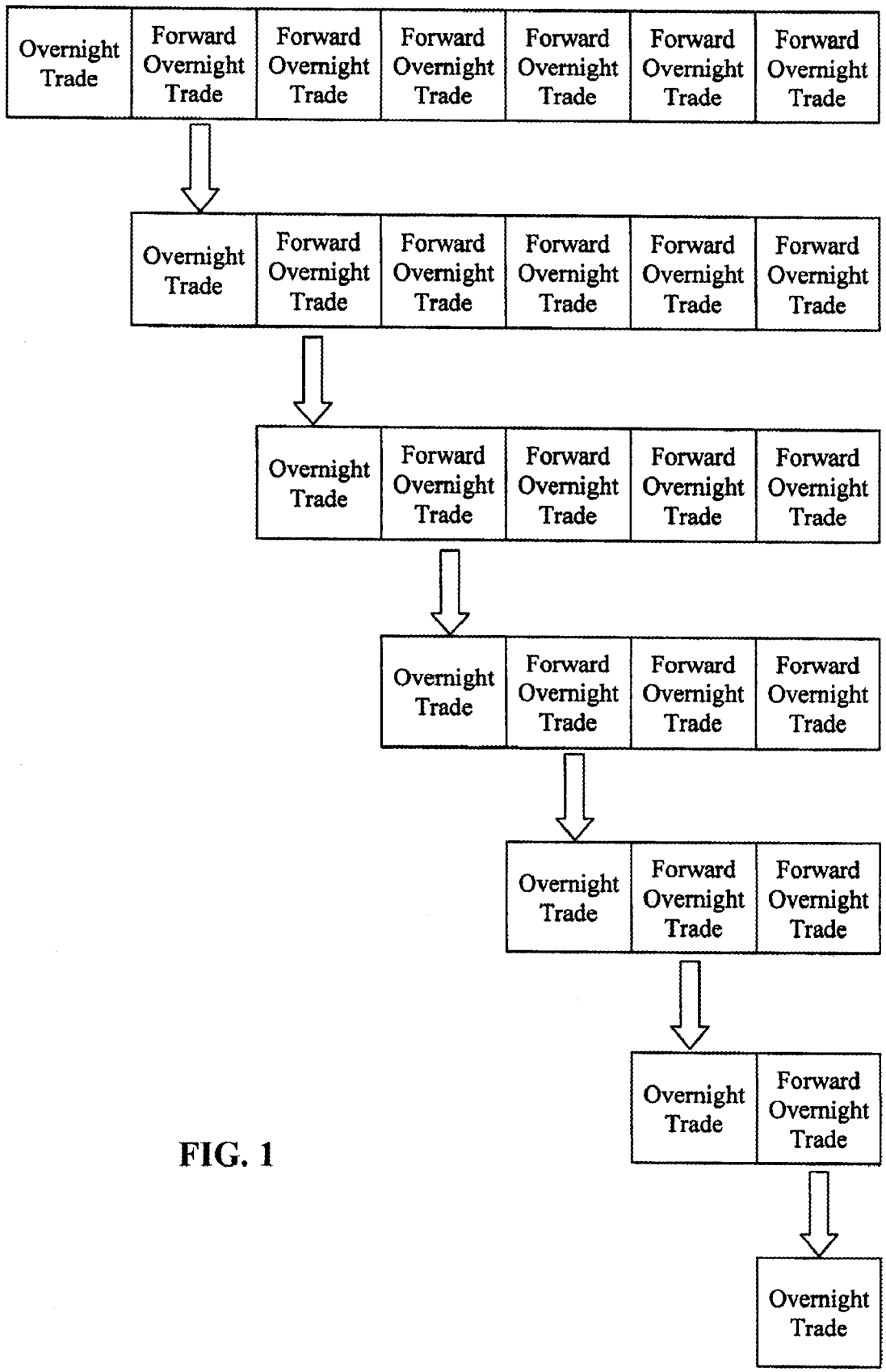
FIG. 1 is a schematic flow chart that illustrates an example of the decomposition of a basket trade into a series of overnight trades in the TradeCalc aspect in accordance with an embodiment of the present invention.

Reference is now made in detail to an embodiment of the present invention, an example of which is illustrated in the accompanying drawings, showing a method and system for the TradeCalc aspects.

TradeCalc Aspect

The TradeCalc aspect comprises a system and method that allows participating trading members (i.e., participants) to transact in a new repo/reverse repo market, in which a member can trade a basket of serial overnight trades with the same notional amounts. Each overnight transaction is an independent overnight repo/reverse trade and will be treated as such for financial reporting purposes. For ease of trading purposes, the basket of serial overnight trades are quoted based on the start date of the first overnight, the maturity date of the last overnight in the series, the underlying collateral (or collateral type), the quantity, the basket financing rate, and the number of substitutions. The basket financing rate may be computed such that it represents the entire series of overnight trades, taking into consideration current market indicative trading levels. Each party to the basket trade can enter the transaction into the party's internal proprietary trade capture system as if it were a term repo/reverse transaction, with the start date equal to the start date of the first overnight trade, the maturity date equal to the maturity date of the last overnight trade in the series, and the financing rate equal to the basket financing rate. Each member's internal systems feeds these basket trades to the TradeCalc aspect processing center.

Members can send (and receive) trade information to (and from) the TradeCalc processing center via: i) a messaging protocol (near real-time), where transactions entered into a member's internal trade capture system are fed to the TradeCalc system; ii) a file load (batch), where transactions entered into the member's internal trade capture system are held in a queue and periodically fed to the TradeCalc system; or iii) direct entry, where the member's internal trade capture system does not feed information to the TradeCalc aspect; instead, the member inputs trades directly through an interface program; after the TradeCalc aspect finishes processing the trades, it displays the trade details, which the member can query and enter into its trade capture system.

After receiving trades from members, the TradeCalc aspect runs a matching program to compare transaction criteria and insure both sides of the transaction have been submitted. If a trade is not matched, the system provides a message to the submitting member(s) informing them of an issue. Additionally, members are able to monitor the status of submitted trades through TradeCalc screens. If the trade is supposed to settle same-day and is not matched by a previously specified time, the system will not split the trade.

Once trades are matched, the TradeCalc aspect cancels the basket trade and creates in its place a series of overnight trades corresponding to the basket trade. For instance, if the basket trade is for seven days, the TradeCalc aspect creates a series of overnight trades having an overnight trade and six forward overnight trades for each of the two members that submitted the matched term trades. The individual rates on each of the overnights are systematically computed based on the basket financing rate and market rate curves. These rates are calculated such that each overnight trade has a market level. Participants are able to monitor the status and view the details of their trades through TradeCalc screens. The TradeCalc aspect transmits the cancellation and the new individual overnight trades back to the originating members indicating the trade decomposition details. Each of the members receives a cancellation for their basket trade and an origination for each new overnight trade.

FIG. 1 is a schematic flow chart that illustrates an example of the decomposition of a basket trade into a series of overnight trades in the TradeCalc aspect in accordance with an embodiment of the present invention. The trades from the TradeCalc aspect feed directly into the member's proprietary systems. These trades then flow through the member's down stream systems as if the traders had manually entered them. Nightly, the first forward overnight trade becomes the current overnight trade, as represented in FIG. 1. Members can either feed all of the decomposed overnight trades to GSCC or only the current overnight and the one-day forward overnight trades. In the latter case, each subsequent business day the next overnight trade in the series feeds to GSCC, such that each day, both the current overnight and the one-day forward overnight will have been submitted to GSCC for novation. By novating the current overnight and the one-day forward overnight trades to the GSCC, members are able to net settle the maturity of the current overnight and the start-leg of the next overnight in the series.

Corrections and cancellations to an individual overnight trade are subject to the TradeCalc aspect matching process. Once matched, the system can automatically correct/cancel the trades in the series with a settlement date greater than that of the submitted trade. Functionality is also provided to correct/cancel a singe trade without affecting any others in the series.

Members can submit bids and offers directly with each other or through an inter-dealer broker network. The TradeCalc aspect is available for both the general collateral (GC) and specials markets. Inter-dealer brokers can provide information relating to the basket trades, such as bid and offer rates for particular maturity dates in the specials and GC markets with specified rights of substitution. The information provided for the GC market can also contain a par or money fill indicator. The provided information for the Specials market defaults to include only par fill.

As known in the art, general accounting rules provide that when a trader enters into a trade that settles outside of the standard settlement cycle (e.g., same-day settlement for a repo), the trade will not be on the firm's balance sheet until the day it settles. Under FIN 41, firms are able to net repos and reverses off the balance sheet when they can be net settled and are with the same counterparty, end date, and clearing location. Consequently, according to the present invention, the decomposed forward-settling trades are not on a member's balance sheet (because they are beyond the standard settlement cycle) and the current overnight trade can be novated to GSCC, increasing FIN 41 balance sheet netting opportunities.

Figure 2:
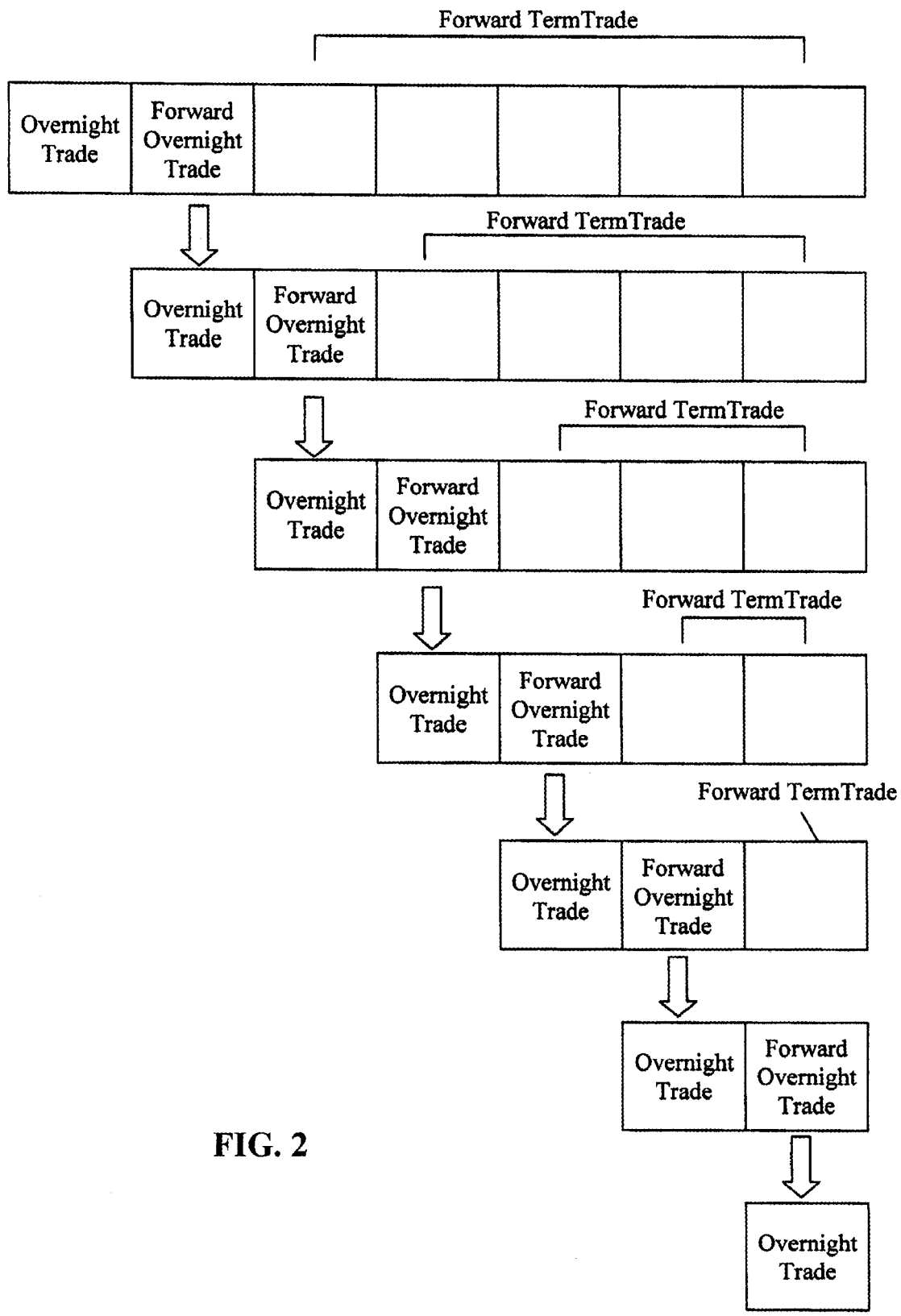
FIG. 2 is a schematic flow chart that illustrates an example of the decomposition of a basket trade into an overnight trade, a forward-settling overnight trade, and a forward-settling term trade in the TradeCalc aspect in accordance with an embodiment of the present invention.

In another embodiment of the present invention, the basket trade can be booked as a current overnight, forward-settling overnight and forward-settling term trade. FIG. 2 is a schematic flow chart that illustrates an example of the decomposition of a basket trade into an overnight trade, a forward-settling overnight trade, and a forward-settling term trade in the TradeCalc aspect in accordance with an embodiment of the present invention. Once trades are matched, the TradeCalc aspect cancels the basket trade, and creates in its place one overnight trade, one forward overnight trade and one forward-settling term trade for each matched trade. Each originating trading member then receives a cancellation for the basket trade and the three new trades: the overnight, the forward overnight and the forward term. These trades flow through the respective members' proprietary systems as if the members had manually entered them. As mentioned earlier, the overnight and forward overnight trades can be novated to GSCC. Each day, the forward term trade is canceled and replaced with a new forward overnight and a new forward term trade, with the previous forward overnight trade becoming the current overnight trade. This daily process continues until the maturity date of the original basket trade, as shown in FIG. 2.

Whether a basket trade is decomposed into a series of overnight trades or into two overnight trades and a forward term trade, CUSIP substitution functionality exists, such that once a substitution occurs the system can automatically change the security and other relevant details of the overnight trades in the series with a settlement date greater than that of the substituted trade. Similar to basket trades, substitutions are subject to the TradeCalc matching process. If any unmatched substitution transactions are not corrected and re-submitted by a predetermined cut-off time, the substitutions do not take effect for same day processing.

The TradeCalc aspect maintains a complete audit trail and linkages for each member's original basket trade and all subsequent overnight and forward trades. TradeCalc retains those trades that have been matched, decomposed, substituted, cancelled, and corrected. The preferred embodiments of the present invention provide members with the ability to inquire on their trade activities, such as the interpolated rates on forward trades, the status of unmatched trades, substitutions, cancellations, and corrections.

Because the TradeCalc system decomposes a basket trade with a term interest rate into a series of independent overnight trades, the present invention provides means to assign market-based interest rates to each of the overnight trades. Additionally, financing interest is paid daily as each of the overnight trades mature (i.e., daily interest clean up for the life of the original basket trade). To that end, the present invention also provides a TradeCalc rate calculation process for devising the daily interest rate for each overnight trade through a series of interpolated daily rates derived from the most current market curve available at the time of trade conversion, which is derived as follows: i) periodically, yield curve points are extracted from a readily available market source; ii) straight-line interpolation is performed for the date points that are not given; iii) the rate on the trade is compared with the rate on the yield curve for the corresponding duration and calculate the spread; and iv) the spread is added to each of the yield curve points extracted from the market source (not the interpolated rates), and these values with their respective durations and the rate on the trade with its corresponding duration are used to determine the forward rates.

The Daily Forward Rate Extraction Formula is then represented by:

Day k's forward=

$$R_{on} + (k-1) * \left[ \left( \frac{\ln(1 + R_{term}*days/36000)}{\frac{\ln(1 + R_{on}/36000)^{\wedge}days}{on*days/36000}} - \frac{R_{on}*days}{36000} \right) * \frac{36000}{(days-1)*days/2} \right]$$

Where:

$R_{on}$=Rate on the overnight trade $R_{term}$=Rate on the term trade k=number of days including overnight days=number of days from overnight to term The above formula is used in an iterative manner using the rates and durations from item iv). For example, assume the market source provides rates for overnight, 1 week, 2 weeks and 3 weeks, and that a trade is desired with a 10-day maturity. Using the data for the overnight and 1 week, forward rates can be calculated for days 2 through 7. Using the $7^{th}$ day forward rate as the new starting point (or overnight rate in the formula) and the 10-day rate from the trade, forward rates can be calculated for days 8 through 10. The interpolated daily interest rates are available to trading members in the TradeCalc aspect via an interest compound calculator function, wherein members can enter the requisite data and compute daily interest compounding based on the above-identified formula via a computer connected to the TradeCalc aspect. This is done to expedite the bid/offer submission process.

The TradeCalc system can be based on an open-ended architecture that facilitates and expedites the exchange of information with its members and includes standardized message formats, instantaneous restart and recovery, real-time connectivity to members and a global world wide web-oriented network. According to preferred embodiments of the present invention, participating trading members of the TradeCalc system may be charged with a desired user fee, for example, for each side of the trade (repo and reverse repo).

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

What is claimed is:

1. A method of trading baskets of serial overnight trades, each of which is treated as an independent overnight repo/reverse trade for financial reporting purposes, with corresponding notional amount, comprising:
   receiving, by software executed by computer hardware, a feed of data regarding basket trades from internal systems of each of a plurality of participants;
   comparing, by software executed by computer hardware, the basket trade data based on predefined transaction criteria to determine that both sides of each basket trade have been received and are matched;
   if each basket trade is matched, canceling, by software executed by computer hardware, each basket trade and creating in its place a series of overnight trades corresponding to each basket trade; and
   sending, by software executed by computer hardware, details of the cancellation and new overnight trades to the originating participants.

2. The method of claim 1, wherein canceling each basket trade and creating in its place the series of overnight trades further comprises canceling the basket trade for n days and creating a series of new overnight trades having an overnight trade and n−1 forward overnight trades for each of two participants that submitted a matched term trade.

3. The method of claim 1, wherein canceling each basket trade and creating in its place the series of overnight trades further comprises canceling each basket trade and creating in its place one overnight trade, one forward overnight trade and one forward term trade.

4. The method of claim 1, further comprising submitting resultant trades for GSCC novation.

5. The method of claim 1, further comprising submitting resultant current overnight and one-day forward overnight trades for GSCC novation.

6. The method of claim 1, further comprising utilizing rate curvature in computing rates for resultant trades, such that the trades have market representative rates.

7. The method of claim 1, further comprising paying interest daily in connection with each maturing overnight trade.

8. A method of trading baskets of serial overnight trades, each of which is treated as an independent overnight repo/reverse trade for financial reporting purposes, with corresponding notional amount, comprising:
   receiving, by software executed by computer hardware, a feed of data regarding basket trades from internal systems of each of a plurality of participants;
   comparing, by software executed by computer hardware, the basket trade data based on predefined transaction criteria to determine that both sides of each basket trade have been received and are matched;
   if each basket trade is matched, canceling, by software executed by computer hardware, each basket trade and creating in its place a series of overnight trades corresponding to each basket trade;
   sending, by software executed by computer hardware, details of the cancellation and new overnight trades to the originating participants; and
   splitting, by software executed by computer hardware, the trade using rate curvature to a daily interest rate for each overnight trade through a series of interpolated daily rates derived from a market curve current at the time of trade conversion, which is derived as follows:
   i) periodically, extracting yield curve points from an available market source;
   ii) performing straight-line interpolation for date points that are not given;
   iii) comparing a rate on the trade with a rate on the yield curve for a corresponding duration and calculating the spread; and
   iv) adding the spread is added to each yield curve point extracted from the market source, and using the resultant values with their respective durations and the rate on the trade with its corresponding duration to determine forward rates.

9. The method of claim 1, wherein the data feed is received via at least one of direct entry and a batch process using File Transfer Protocol.

10. The method of claim 1, further comprising propagating substitutions, cancellations, and corrections to all trades in a series.

11. The method of claim 1, further comprising charging participants a fee.

12. A system for trading baskets of serial overnight trades, each of which is treated as an independent overnight repo/reverse trade for financial reporting purposes, with corresponding notional amount, comprising:
   a server pre-programmed for receiving a feed of data regarding basket trades from internal systems of each of a plurality of participants;
   comparing the basket trade data based on predefined transaction criteria to determine that both sides of each basket trade have been received and are matched;
   if each basket trade is matched, canceling each basket trade and creating in its place a series of overnight trades corresponding to each basket trade;
   and sending details of the cancellation and new overnight trades to the originating participants.

13. The method of claim 8, wherein canceling each basket trade and creating in its place the series of overnight trades further comprises canceling the basket trade for n days and creating a series of new overnight trades having an overnight trade and n−1 forward overnight trades for each of two participants that submitted a matched term trade.

14. The method of claim 8, wherein canceling each basket trade and creating in its place the series of overnight trades further comprises canceling each basket trade and creating in its place one overnight trade, one forward overnight trade and one forward term trade.

15. The method of claim 8, further comprising submitting resultant trades for GSCC novation.

16. The method of claim 8, further comprising submitting resultant current overnight and one-day forward overnight trades for GSCC novation.

17. The method of claim 8, further comprising utilizing rate curvature in computing rates for resultant trades, such that the trades have market representative rates.

18. The method of claim 8, further comprising paying interest daily in connection with each maturing overnight trade.

19. The method of claim 8, wherein the data feed is received via at least one of direct entry and a batch process using File Transfer Protocol.

20. The method of claim 8, further comprising propagating substitutions, cancellations, and corrections to all trades in a series.

21. The method of claim 8, further comprising charging participants a fee.

* * * * *